Feb. 5, 1957  A. P. DUNLOP  2,780,588
STABILIZATION OF LEVULINIC ACID
Filed Dec. 8, 1954
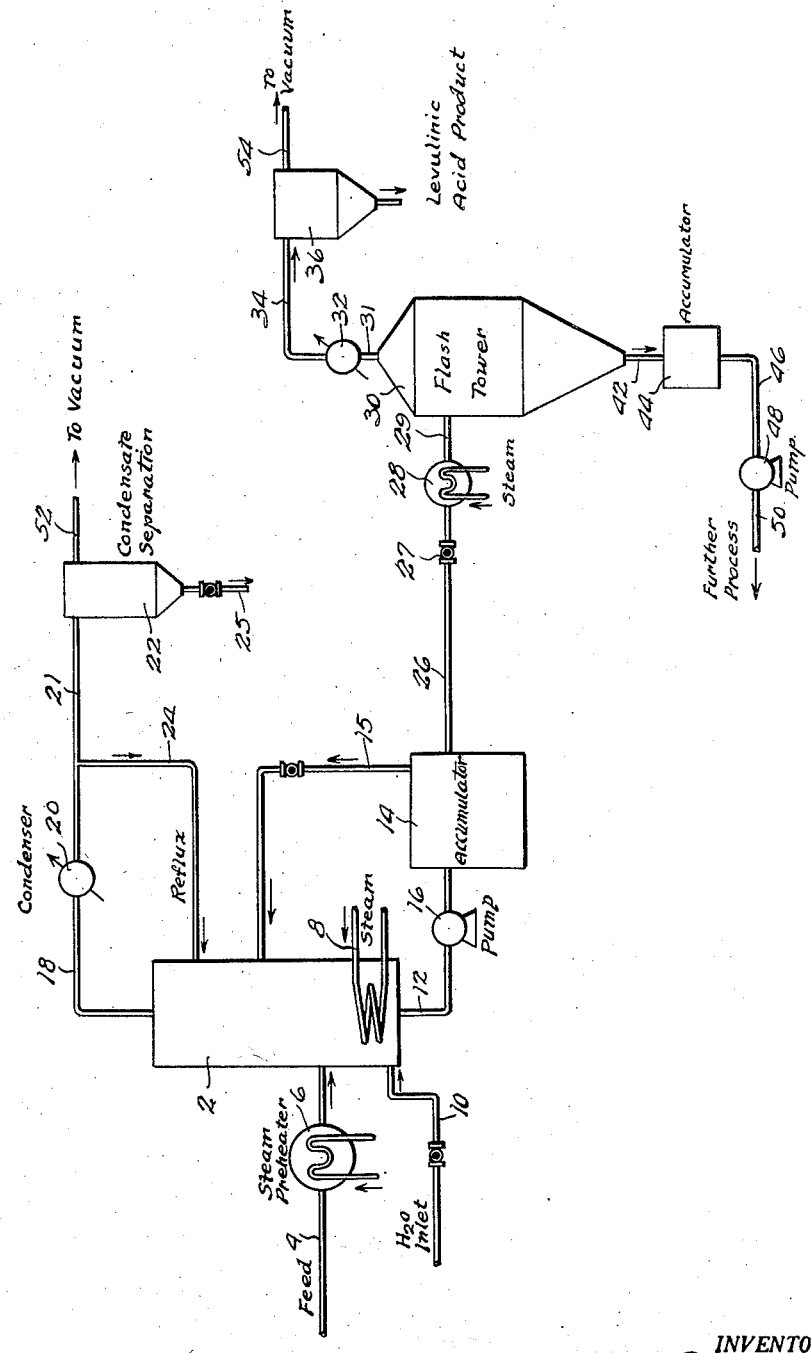
INVENTOR.
Andrew P. Dunlop.
BY
Thiess, Olsen, Mecklenburger,
von Holst & Coltman. Attys.

United States Patent Office 2,780,588
Patented Feb. 5, 1957

2,780,588

STABILIZATION OF LEVULINIC ACID

Andrew P. Dunlop, Riverside, Ill., assignor to The Quaker Oats Company, Chicago, Ill., a corporation of New Jersey Application December 8, 1954, Serial No. 473,950

16 Claims. (Cl. 202—52)

The present invention relates to a process for the stabilization of levulinic acid and, more particularly, this invention relates to a process of separating solvent from a solution of levulinic acid in a nonaqueous solvent.

In order to better appreciate the contribution made to the art by this invention, the following considerations should be borne in mind. It is known that levulinic acid may be produced by reacting a hexose-yielding material with an aqueous solution containing an acid catalyst, such as sulfuric acid. The reaction step is followed by a filtration step in which solids are removed and the resulting process liquor is contacted with a nonaqueous levulinic acid extractive solvent, such as methyl isobutyl ketone. The subsequent separation of the levulinic acid and the extractive solvent is usually effected by fractional distillation. Such a process is disclosed in the copending application of Dunlop and Wells, Serial No. 372,532, filed August 5, 1953.

The prior art suggests that fractional distillation may be used in the separation of levulinic acid from a number of nonaqueous solvents, such as methylene chloride, furfural, butanol, and the above-mentioned methyl isobutyl ketone. However, it is known that levulinic acid has a tendency to decompose on heating to alpha and beta angelica lactones, the rate of this decomposition increasing as the temperature is increased. These lactones are undesirable impurities since they have a tendency to polymerize and to discolor the final levulinic acid product. The angelica lactones are formed as a result of a molecule of water being eliminated from the levulinic acid molecule. To minimize lactone formation by the known processes, the solvent separation is usually effected by distillation under reduced pressure and, consequently, reduced temperature. It has been found, nevertheless, that distillation of a levulinic acid solvent solution under reduced pressure as low as 1 mm. of mercury still results in a levulinic acid product containing one per cent or more of the undesirable lactones. It will be readily appreciated that the attainment of such a reduced pressure is virtually impossible in ordinary commercial practice. Consequently, by distillation under the usual vacuum conditions obtainable in commercial operations, the lactone content of the final product is at least three percent or more thereby resulting in a product which tends to darken rapidly under the usual storage conditions.

Accordingly, it is an object of this invention to provide a levulinic acid production method in which the formation of the undesirable lactones is substantially eliminated.

It is a further object of this invention to provide a process in which the levulinic acid-solvent separating step is readily adaptable to either batch or continuous operations, and which results in a final levulinic acid product which is stable against coloration upon normal storage.

A further object of this invention is the provision of a commercially feasible process in which levulinic acid is separated from a nonaqueous solvent by an inexpensive procedure.

A still further object of this invention is to provide a process in which levulinic acid is readily and completely separated from a nonaqueous solvent to produce a product which is essentially free of undesired color-producing angelica lactones.

A further and additional object is the provision of a process for stabilizing levulinic acid when the latter is heated to a temperature which would otherwise be conducive to angelica lactone formation.

Further objects will appear from the following description, the accompanying drawing and the appended claims.

In accordance with one embodiment of this invention, there has been provided a process, adaptable to either batch or continuous operations, in which a volatile, nonaqueous solvent is separated from a levulinic acid solution at an elevated temperature. The process involves the addition of a small amount of water to the solution during a fractional distillation procedure. Preferably a preheated levulinic acid-solvent solution is introduced into a central point of a fractionating column. Simultaneously a small amount of water is added at the base of the column in a substantially continuous manner. The vaporous distillate, containing primarily solvent and some water vapor, is withdrawn from the top of the column and passes to a condenser and thence into a separator from which the solvent is separated and recycled for further use in the levulinic acid extraction zone. The bottoms from the column contain a small amount of water and the desired levulinic acid. In a levulinic acid production process, such as described in said application Serial No. 372,532, the levulinic acid-rich bottoms or residue essentially free of solvent also contains nonvolatile tars and these bottoms are then passed from the fractionating column into a flashing zone to separate levulinic acid (containing a small amount of water) and a nonvolatile tar fraction. The latter fraction which also contains some levulinic acid is cycled to an earlier stage in the production process as disclosed in said application. By maintaining a low concentration of water in the bottom of the fractionating column, the formation of the undesired angelica lactones is substantially prevented.

For a more complete understanding of this invention, reference is now made to the accompanying drawing which schematically depicts one embodiment of the invention.

The feed, which may comprise approximately 70% to 80% of a nonaqueous solvent, such as methyl isobutyl ketone, and 20% to 30% of a higher boiling fraction comprising levulinic acid and nonvolatile tars, enters a fractionating column 2 by means of a line 4. A suitable feed is one in which the percentage of the nonvolatile tars in the higher boiling fraction varies between 10% and 40% and said feed comprises an extract produced in accordance with the process disclosed in said copending application Serial No. 372,532. The column 2 may be approximately 20 feet in height and may have a 20 inch diameter. The column is packed with Raschig rings but may also contain bubble caps or other suitable contact elements. In addition, the column 2 is preferably maintained under a vacuum of 30 to 70 mm. of mercury, absolute pressure, and may employ a reboiler coil at the base thereof to maintain a temperature of approximately 300° to 340° F. Distillation in the column takes place utilizing a suitable reflux ratio, for example, about 2 to 1.

Prior to entrance into the fractionating column 2, the feed passes through a steam preheater 6 in which it is heated to a temperature of approximately 200° F. Steam coils 8 impart to the fractionating column the desired reboiler temperature. In accordance with this invention, water is introduced into the base of the column 2 by means of a valved line 10. It should, at this time, be noted that the minimum amount of water to be added is that amount which insures the presence of a small amount of water in the column bottoms at all times while the maximum amount of water is usually governed by the amount of water that can be tolerated in the final levulinic acid product. Usually the amount of water in the bottoms withdrawn is between about 0.05 and 5 percent by weight, preferably between about 0.1 and 2.0 percent by weight.

The column bottoms, which comprise essentially levulinic acid and nonvolatile tarry materials (if present in the material charged to the column), together with the water in the amount above indicated, emerge through line 12 and are collected in an accumulator tank 14 after passing through a pump 16. Notice will be given to the valved return line 15, connecting the accumulator tank 14 to the column 2, which aids in the control of column conditions as will be understood in this art. The distillation step which is effected at a column pressure of approximately 30 to 70 mm. of mercury results in an overhead distillate containing essentially water and solvent together with small amounts of levulinic acid. The distillate passes through line 18, a condenser 20, line 21, and thence to the condensate separation chamber 22. The latter chamber has a valved line 25 for withdrawing water and solvent to a solvent storage tank (not shown). Solvent from the storage tank is recycled to the extraction process and water is withdrawn from the stratified water layer in the storage tank for recycle to the fractionating column through line 10. Return line 24 leads from line 21 to a top portion of the column 2, and recycles a desired amount of condensed vapor as reflux for further regulating column conditions.

Attention is invited to the fact that levulinic acid is very hygroscopic in nature. Consequently, the fractionating process as so far described enables water in the liquid state to be present in the column bottoms at all times, despite the temperatures and pressures stated above or irrespective of whether the water is introduced into the column through line 10 in the liquid state or as steam. The solvent is completely separated from the levulinic acid in the column and this separation is aided by steam formed from a portion of the introduced water. However, it is the continual presence of water in the bottoms withdrawn from the column 2 which tends to counteract the undesired lactone formation at the prevailing temperature. The location of the water inlet 10 is below the point of introduction of the feed into the column and is preferably below the reboiler coil 8 in proximity to the bottoms outlet 12 assuring intimate water-bottoms contact, complete solvent stripping, and a minimum of lactone formation.

The levulinic acid and nonvolatile tarry products residue collecting in the accumulator 14 passes through a line 26, a pressure reduction valve 27, and into a steam-heated preheater 28. The preheater 28 imparts a temperature to the residue material of approximately 285° to 315° F. The preheated material is then passed through line 29 into a flash tower 30, which is maintained under about 10 to 20 mm. of mercury vacuum. The flash tower is maintained at a temperature of approximately 350° F. by a supplemental heating coil (not shown). Upon entering the flash tower, a portion of the levulinic acid is flashed over through line 31, to a condenser 32, through line 34, and into an accumulator 36 from which it is passed to storage as the desired product.

The bottoms from the flash tower 30 pass through line 42 and into an accumulator 44 from which they pass by means of line 46 into pump 48 and through line 50 which leads to further processing for recovering the levulinic acid values contained therein, as disclosed in said application Serial No. 372,532. It is pointed out that the bottoms emerging from the flash tower 30 through the line 42 may contain a levulinic acid content of about 50%. This levulinic acid content is desired to give the emerging bottoms or residue product sufficient fluidity in the course of further piping or processing.

It will be understood that separators 22 and 36 are provided with vacuum lines 52 and 54 to provide the desired degree of vacuum in the towers 2 and 30, respectively.

In order to further illustrate the process of this invention, the following examples are disclosed to factually substantiate the improvement herein set forth:

Example 1

A solution containing levulinic acid, nonaqueous solvent and nonvolatile products obtained from an extraction step, such as is disclosed in said copending application Serial No. 372,532, was preheated to a temperature of about 200° F. The solution contained approximately thirteen parts of methyl isobutyl ketone, six parts of levulinic acid, and one part of nonvolatile tarry products, all parts by weight. The preheated charge was fed into a fractionating tower approximately 20 feet high and 20 inches in diameter which was packed with Raschig rings and maintained at an absolute pressure of about 45 mm. mercury. The column reboiler was heated by means of steam coils whereby a temperature of approximately 330° F. was maintained. Concomitantly with the introduction of the feed, water was also introduced into the lowermost portion of the column, at a rate of approximately 20 cc. per minute. The levulinic acid-solvent solution was fed into the midpoint of the fractionator at a rate of approximately 60 pounds per hour. Methyl isobutyl ketone and water were distilled off with a reflux ratio of approximately 1.8 to 1 being maintained. After approximately 280 pounds of bottoms product containing 84% levulinic acid and 1.5% water were accumulated, the bottoms product was fed through a heat exchanger in which the temperature was brought to 295° F. and into a flash chamber maintained at approximately 11 mm. of mercury vacuum. The feed was introduced into the flash chamber at a rate of approximately 195 pounds per hour and 33% of the feed was flashed off. The recovered flashings had a composition of 96.7% levulinic acid, 2.2% water and 1.4% lactones and the product was very stable against decolorizing upon storage.

Example 2

The above example should be contrasted with the following Example 2 which employed the same physical apparatus and operating conditions indicated in Example 1, save that the rate of feed introduction into the fractionating tower was 74 pounds per hour and no water was added to the column. Thereafter 292 pounds of bottoms product, which contained 78.2% of levulinic acid, no water and no methyl isobutyl ketone, were recovered from the fractionating tower. The bottoms product was then introduced into the flash tower at the rate of 144 pounds per hour, whereafter 33.6% of the feed was flashed overhead. An analysis of the recovered flashings revealed a product containing 90.2% levulinic acid and 8.8% lactones. This product rapidly darkened upon storage due to the high lactone content.

It will be noted that the percentage of lactone in the product of Example 2 is about six times greater than that of Example 1. This greater lactone formation is attributed to the absence of water in the distillation step. The stripping process, as described in Example 2, has heretofore been the ordinary manner of recovering levulinic acid from a nonaqueous solvent.

It will be readily appreciated by those skilled in the art that the specifically mentioned temperatures, pressures, feed rates, etc., need not be adhered to strictly, as has previously been stated. However, the water should be present in the fractionator only in a small amount sufficient to effectively inhibit the levulinic acid from dehydrating to form the lactones. The presence of small amounts of water in the final product is far less objectionable than the presence of the lactones which latter have a tendency to polymerize and discolor the final product. In a continuous operation, such as that described above in connection with the drawing, the amount of water introduced into the column 2 should be such that the levulinic acid-containing bottoms withdrawn through line 12 should also contain between about 0.05 and 5.0 percent by weight of water, preferably between about 0.1 and 2.0 percent by weight. It is the presence of this water in the levulinic acid which suppresses lactone formation when the levulinic acid is heated to the temperatures prevailing in the bottom of the column. It will be apparent that actual column conditions will determine the rate at which the water, as such, or as steam, should be added to the column to maintain the water content of the bottoms within the range specified. As has been mentioned previously, any of the other well known, volatile, nonaqueous levulinic acid extractive solvents, such as furfural, butanol and methylene chloride, will work to equal advantage in the present process.

While this invention has been specifically described with reference to a levulinic acid distillation procedure, it also has applicability to other procedures or processes involving the processing of levulinic acid at elevated temperatures where it is desired to inhibit lactone formation. Thus it has been discovered that if levulinic acid is heated to a temperature of about 150° C., lactones will normally form at a rate of about 3% per hour. However, in accordance with the broad aspects of this invention, lactone formation is prevented if such heating is carried out in the presence of a small amount of water within the ranges above specified. Thus the invention has broad utility in carrying out reactions above about 100° C. wherein the reaction medium is normally nonaqueous in nature and contains levulinic acid. For example, the process is useful in an esterification procedure. Esterification is usually carried out under anhydrous conditions; however, at esterification temperatures the anhydrous levulinic acid will slowly dehydrate to form the undesired lactones. Thus by purposely adding a small amount of water to the reaction mixture as above specified, lactone formation is minimized, thereby producing a levulinic acid ester product essentially free of pseudo-esters and such amounts of lactone as would lead to a high degree of color in the final product. In all such procedures, only small amounts of water are necessary to achieve the desired result, e. g. about 0.05 to 5.0 percent by weight, preferably about 0.10 to 2.0 percent by weight.

Thus a new method has been disclosed for processing levulinic acid at elevated temperatures wherein the final product contains a minimum amount of the usual contaminating angelica lactones. The process has particular usefulness in the distillation of a nonaqueous solvent from a levulinic acid solution containing same. It is readily appreciated that the detailed process steps, conditions, and apparatus disclosed above are readily adaptable to modifications by those skilled in the art, and the process, therefore, is to be limited only by the scope of the appended claims.

I claim:

1. A method for the prevention of lactone formation in the solvent stripping of a solution containing levulinic acid and a nonaqueous solvent therefor which comprises introducing said solution into a stripping zone, introducing into said zone a sufficient quantity of water to maintain water in contact with the levulinic acid substantially throughout the stripping period whereby to inhibit the formation of lactones during said stripping, and recovering levulinic acid stripped of said solvent.

2. A continuous process for the recovery of levulinic acid from a solution containing levulinic acid and a nonaqueous solvent which comprises continuously passing said solution into a fractionation zone, concomitantly and continuously passing water into said zone, and rectifying said solution and water mixture whereby a bottoms concentrate containing essentially levulinic acid and water is formed.

3. A continuous process for the recovery of levulinic acid from a solution containing levulinic acid, nonvolatile products and a nonaqueous solvent which comprises continuously passing said solution into a fractionating zone, continuously and concomitantly introducing water into said zone, rectifying said solution and water mixture whereby a bottoms concentrate containing essentially levulinic acid, water and nonvolatile products is formed, removing said concentrate from said fractionating zone, and separating said levulinic acid from said nonvolatile products.

4. A continuous process for the recovery of levulinic acid from a solution containing levulinic acid, nonvolatile products and a nonaqueous solvent which comprises continuously passing said solution into a fractionating zone maintained at subatmospheric pressure, continuously and concomitantly introducing water into said zone at a point beneath the point of introduction of said solution into said zone, rectifying said solution and water mixture whereby a bottoms product containing essentially levulinic acid, water and nonvolatile products is formed, removing said product from said fractionating zone, and separating said levulinic acid from said nonvolatile products.

5. A continuous process for the recovery of levulinic acid from a solution containing levulinic acid, nonvolatile products and a nonaqueous solvent which comprises continuously passing said solution into a fractionating zone, continuously and concomitantly introducing water into said zone, rectifying said solution and water mixture, whereby a bottoms product containing essentially levulinic acid, water and nonvolatile products is formed, passing said bottoms product into a zone of reduced pressure whereby a portion of levulinic acid and water is flashed overhead and recovered, and further processing the nonvolatile products for the levulinic acid values contained therein.

6. A continuous process for the recovery of levulinic acid from a solution containing levulinic acid and a nonaqueous solvent which comprises continuously passing said solution into a rectification zone maintained at subatmospheric pressure, continuously and concomitantly introducing water into said zone, withdrawing a levulinic acid-containing bottoms product from said zone, controlling the rate of introduction of said water so that the water content of the withdrawn bottoms product is maintained within the range of between about 0.05 and 5.0 percent by weight, and separately withdrawing a vapor product containing water and solvent vapors from said zone.

7. A continuous process for the recovery of levulinic acid from a solution containing levulinic acid, nonvolatile products and a nonaqueous solvent comprising continuously passing said solution into a rectification zone maintained at an absolute pressure of about 30 to 70 mm. of mercury, continuously introducing water into said zone at a point below the point of introduction of said solution into said zone, introducing said water at such a rate so as to insure the presence at all times of liquid water in the bottoms in the course of rectification, condensing said solvent and water distillate emerging from said zone, passing a bottoms product containing essentially levulinic acid, water and nonvolatile products from said rectification zone at a temperature of about 285° to 315° F. into a zone maintained at an absolute pressure of about 10 to 20 mm. of mercury, whereby a portion of the levulinic acid and water is flashed overhead and recovered, and processing the residue from said latter zone so as to recover the levlinic acid contained therein.

8. The process of claim 7 in which said solvent is methyl isobutyl ketone.

9. The process of claim 7 in which said solvent is furfural.

10. The process of claim 7 in which said solvent is methylene chloride.

11. The process of claim 7 in which said solvent is butanol.

12. A continuous process for the recovery of levulinic acid from a solution containing about 70 percent to 80 percent by weight of nonaqueous solvent and 20 to 30 percent by weight of a fraction containing levulinic acid and nonvolatile products in which the ratio between said levulinic acid and said nonvolatile products in said fraction is between about 2½ to 1 and about 10 to 1, comprising heating said solution, passing said solution into a rectification zone maintained at subatmospheric pressure, concomitantly passing water into said zone at a point below the point of introduction of said solution into said zone, rectifying said solution and water mixture, said water being passed into said zone at least at such a rate as will assure the maintenance at all times of liquid water in the bottoms in the course of said rectification, condensing the water and solvent distillate, withdrawing said bottoms containing said levulinic acid, said nonvolatile products and water from said zone at a point in substantially close proximity to said point of water introduction into said rectification zone, preheating said bottoms and passing them into a zone maintained at subatmospheric pressure, whereby a portion of said levulinic acid is flashed overhead and recovered as product, processing the residue from said latter zone for further levulinic acid recovery.

13. The process recited in claim 12 wherein the amount of said water in the bottoms withdrawn from said zone is between about 0.05 and 5.0 percent by weight.

14. The process recited in claim 12 wherein the amount of said water in the bottoms withdrawn from said zone is between about 0.1 and 2.0 percent by weight.

15. In a process of treating an essentially nonaqueous medium containing levulinic acid at an elevated temperature in excess of about 100° C., the step of maintaining in said medium a small amount of water within the range of between about 0.05 and 5.0 percent by weight.

16. In a process for the separation of levulinic acid from a solution containing levulinic acid and a nonaqueous solvent therefor by distillation at elevated temperatures, the improvement of adding water to said solution during distillation whereby water is maintained in contact with the levulinic acid at substantially the entire period of time during which the elevated temperatures are maintained whereby to minimize lactone formation.

References Cited in the file of this patent

UNITED STATES PATENTS 2,257,389   Macallum  _____  Sept. 30, 1941